(12) United States Patent
Jia et al.

(10) Patent No.: US 11,689,312 B2
(45) Date of Patent: *Jun. 27, 2023

(54) SYSTEM AND METHODS FOR COHERENT OPTICAL EXTENSION

(71) Applicant: CABLE TELEVISION LABORATORIES, INC., Louisville, CO (US)

(72) Inventors: Zhensheng Jia, Superior, CO (US); Curtis Dean Knittle, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,595

(22) Filed: Dec. 27, 2021

(65) Prior Publication Data

US 2022/0158751 A1 May 19, 2022

Related U.S. Application Data

(63) Continuation of application No. 16/730,089, filed on Dec. 30, 2019, now Pat. No. 11,212,028, which is a
(Continued)

(51) Int. Cl.
*H04B 10/29* (2013.01)
*H04J 14/02* (2006.01)
*H04B 10/61* (2013.01)

(52) U.S. Cl.
CPC .......... *H04J 14/0282* (2013.01); *H04B 10/29* (2013.01); *H04B 10/61* (2013.01); *H04J 14/0204* (2013.01); *H04J 14/0209* (2013.01)

(58) Field of Classification Search
None
See application file for complete search history.

(56) References Cited

U.S. PATENT DOCUMENTS

| 5,521,733 A | * | 5/1996 | Akiyama | G02B 6/4215 |
| | | | | 398/48 |
| 6,944,406 B1 | * | 9/2005 | Way | H04J 14/0246 |
| | | | | 398/82 |

(Continued)

OTHER PUBLICATIONS

Lavery: "Digital Coherent Receivers for Passive Optical Networks", A thesis submitted to the University College London (UCL) for the degree of Doctor of Philosophy, Sep. 2013 (Year: 2013).*

*Primary Examiner* — Li Liu
(74) *Attorney, Agent, or Firm* — Josh Snider

(57) ABSTRACT

A coherent passive optical network extender apparatus includes an extender transceiver for communication with an associated optical headend. The extender transceiver includes at least one receiving portion, at least one transmitting portion, and an extension processor. The apparatus further includes a signal adaptation unit configured to convert a downstream electrical transmission lane into a plurality of individual wavelengths. Each of the converted individual wavelengths are for transmission to one of an optical node and an end user. The apparatus further includes a plurality of transceivers, disposed within the signal adaptation unit, and configured to process and transmit the converted individual wavelengths as a bundle for retransmission to the respective end users.

19 Claims, 4 Drawing Sheets

Related U.S. Application Data continuation of application No. 15/609,461, filed on May 31, 2017, now Pat. No. 10,523,356.

(60) Provisional application No. 62/343,219, filed on May 31, 2016.

(56) References Cited

U.S. PATENT DOCUMENTS

| | | | | |
|---|---|---|---|---|
| 7,031,610 B2* | 4/2006 | Honda | G02B 6/2938 | 385/24 |
| 8,184,987 B2* | 5/2012 | Chen | H04J 3/1694 | 398/160 |
| 8,275,268 B2* | 9/2012 | Kazutaka | H04B 10/29 | 398/30 |
| 8,428,456 B2* | 4/2013 | Zheng | H04J 14/0287 | 398/5 |
| 8,457,493 B2* | 6/2013 | Mizutani | H04Q 11/0067 | 398/58 |
| 9,112,613 B2* | 8/2015 | Kim | H04J 14/0282 | |
| 9,935,727 B2* | 4/2018 | Boyd | H04B 10/40 | |
| 10,523,356 B2* | 12/2019 | Jia | H04J 14/0209 | |
| 11,212,028 B2* | 12/2021 | Jia | H04B 10/29 | |
| 2004/0033076 A1* | 2/2004 | Song | H04J 14/028 | 398/70 |
| 2007/0269212 A1* | 11/2007 | Remein | H04J 3/1694 | 398/63 |
| 2009/0016725 A1* | 1/2009 | Chouzenoux | H04J 14/02 | 398/79 |
| 2009/0080890 A1* | 3/2009 | Miura | H04B 10/29 | 398/58 |
| 2009/0110398 A1* | 4/2009 | Pfeiffer | H04B 10/272 | 398/63 |
| 2009/0175619 A1* | 7/2009 | Effenberger | H04Q 11/0067 | 398/38 |
| 2010/0111532 A1* | 5/2010 | Chen | H04J 3/1694 | 398/67 |
| 2010/0189433 A1* | 7/2010 | Trojer | H04Q 11/0067 | 398/8 |
| 2011/0038632 A1* | 2/2011 | Zou | H04B 10/27 | 398/72 |
| 2011/0085799 A1* | 4/2011 | Mizutani | H04Q 11/0067 | 398/37 |
| 2011/0129214 A1* | 6/2011 | Zheng | H04Q 11/0067 | 398/58 |
| 2011/0135306 A1* | 6/2011 | Kim | H04J 14/0252 | 398/68 |
| 2011/0317995 A1* | 12/2011 | Zheng | H04L 41/0663 | 398/2 |
| 2012/0121252 A1* | 5/2012 | Kim | H04J 14/0276 | 398/16 |
| 2013/0044368 A1* | 2/2013 | Xu | H04B 10/2972 | 359/341.1 |
| 2014/0126907 A1* | 5/2014 | Hirth | H04Q 11/0062 | 398/58 |
| 2014/0161446 A1* | 6/2014 | Lee | H04J 14/0221 | 398/67 |
| 2014/0161456 A1* | 6/2014 | Sugawa | H04J 14/0252 | 398/71 |
| 2014/0186043 A1* | 7/2014 | Kim | H04B 10/29 | 398/97 |
| 2014/0270774 A1* | 9/2014 | Dai | H04J 14/0282 | 398/67 |
| 2015/0215914 A1* | 7/2015 | Cho | H04L 41/0816 | 370/235 |
| 2015/0318950 A1* | 11/2015 | Boyd | H04B 10/801 | 398/68 |
| 2015/0373430 A1* | 12/2015 | Kim | H04Q 11/0067 | 398/48 |
| 2016/0197697 A1* | 7/2016 | Bonk | H04J 14/0282 | 398/58 |

* cited by examiner

SYSTEM AND METHODS FOR COHERENT OPTICAL EXTENSION

CROSS REFERENCE TO RELATED APPLICATIONS

This application is a continuation of U.S. patent application Ser. No. 16/730,089, filed Dec. 30, 2019, which is a continuation of U.S. patent application Ser. No. 15/609,461, filed May 31, 2017, which application claims the benefit of and priority to U.S. Provisional Patent Application Ser. No. 62/343,219, filed May 31, 2016, which applications are incorporated herein by reference in their entireties.

BACKGROUND

The field of the disclosure relates generally to fiber communication networks, and more particularly, to access networks capable of transmitting coherent optical signals.

Fiber-to-the-premise (FTTP) based access networks have been widely deployed in many regions of the world. Increasing demand for high-speed data and video services is presently driving growth in access bandwidth requirements, up to gigabits per second (Gb/s) for residential offerings and multi-Gb/s for business. Conventional FTTP network architectures utilize a passive optical network (PON), for example, a Gigabit passive optical network (GPON) within ITU-T, or an Ethernet passive optical network (EPON) within IEEE. PON is point-to-multipoint, and can be an economical alternative to point-to-point Ethernet for moderate to large populations. GPON and EPON networks have been deployed in the last 10 years, and presently realize 2.5/1.25 Gb/s data rates for downstream and 1.25 Gb/s upstream, respectively. 10-Gb/s PON (XG-PON or IEEE 10G-EPON) is being quickly deployed for high-bandwidth applications. GPON and EPON have some technical differences in terms of signal encapsulation and dynamic bandwidth allocation, but both PON types are capable of carrying data over fiber through a passive optical network all the way from an optical hub to a customer premise. Additionally, both PON types use baseband digital signaling over the fiber to carry the information.

FIG. 1 is a schematic illustration of a conventional PON system 100 for delivering PON to subscribers of a network operator. System 100 includes an optical headend (OHE) 102, a splitter 104, and a plurality of optical network units (ONU) 106 in communication with a plurality of customer premises 108, respectively. Optical hub 102 is, for example, a central office, a communications hub, and includes an optical line terminal (OLT) for converting standard signals from a service provider (not shown) to the frequency and framing used by the PON system, and for coordinating multiplexing between conversion devices on the ONUs located on or near customers premises 108.

The OLT contains a central processing unit (CPU), passive optical network cards, a gateway router (GWR) and voice gateway (VGW) uplink cards, ONUs 106 are downstream termination units for the respective customer premises 108. System 100 may be configured, for example, for 1-to-32 or 1-to-64 split ratios, over a distance of 20 kilometers, and using a fixed set of wavelengths. In a typical configuration, a PON trunk fiber 110 carries optical signals from OHE 102 to splitter 104. Splitter 104 then splits the optical signals from PON trunk fiber 110 into the different fixed wavelengths, which are then carried between splitter 104 and ONUs 106 by individual short fibers 112.

Conventional architectures like system 100, however, presently experience several drawbacks. Most OHEs, for example, have fewer PON trunk fibers available to the splitter, or node, than are required for the increasing number of subscribers. Additionally, many modern cable operators utilize a Data Over Cable Service Interface Specification (DOCSIS) infrastructure that may potentially transmit as far as 100 miles, which is considerably farther than distances supported by conventional PON technologies, which are typically limited to 20 kilometers (km). Therefore, a conventional PON extension system has been utilized to extend the transmission range of PON networks up to these increasing ranges required by a cable operator.

FIG. 2 is a schematic illustration of a conventional PON extension system 200 for deploying a PON over distances greater than 20 km. System 200 includes an OHE 202, a PON extender 204, and a plurality of ONUs 206, which may be in communication with a plurality of respective customer premises (not shown). ONUs 206 transmit and receive optical carrier signals to/from PON extender 204 by short fibers/nodes 208, and PON extender 204 connects with OHE 202 through trunk fiber 210. Short fibers/nodes 208 recover PON signal streams from PON extender 204 and transmit the recovered signals to ONUs 206 using standard PON optics. Respective nodes of short fibers/nodes 208 may also function as splitters. ONUs 206 will include 32-64 ONUs per group, and will have a symmetric architecture (e.g., ONU 206(1), 10/10G-EPON), or an asymmetric architecture (e.g., ONU 206(1)', 10/1G-EPON).

OHE 202 includes an OLT 212, a plurality of hub transceivers 214, and an optical multiplexer 216. Hub transceivers 214 may be Wavelength-Division Multiplex Small Form Factor Pluggable transceiver (PXFP-WDM) modules. Hub transceivers 214 may also each be a combination of at least one receiver and at least one transmitter (not separately shown). Hub transceivers 214 are each configured to transmit a downstream optical signal $\lambda_D$ to multiplexer 216, and similarly receive an upstream optical signal Xu from multiplexer 216 (where multiplexer 216 also functions as a demultiplexer). Multiplexer 216 combines the plurality of downstream optical signals $\lambda_D$ for downstream transmission over trunk fiber 210. Similarly, multiplexer 216 also splits the upstream transmission from trunk fiber 210 into the plurality of respective upstream optical signals $\lambda_U$.

PON extender 204 includes a demultiplexer 218, a plurality of extender transceivers 220, and a plurality of respective extender optics 222 for each extender transceiver 220. Extender transceivers 220 each include at least one digital signal processor (DSP, not shown) and are, for example, a 10G multisource agreement (MSA) transceiver module. Extender optics 222 are, for example, 10G EPON optics. Transmission between the respective hub transceivers 214 and extender transceivers 220 over trunk fiber 210 represents a PON trunk link 224. Transmission between the respective extender optics 222 and ONUs 206 over short fibers/nodes 208 represents a PON access link 226. PON extenders are sometimes referred to as "PON concentrators" due to their ability to carry multiple PONs on a single fiber between the OLT and the PON extender.

PON extension system 200 disposes OLT 212 within OHE 202, and represents a centralized architecture for utilizing Wavelength-Division Multiplex (WDM) optics, as opposed to standard PON optics with fixed wavelengths, to deploy 10G-EPON where there is a limited number fibers for the number of subscribers, and for distances over 20 km. That is, WDM technology is used to multiplex a plurality of PON streams $\lambda$ onto a single fiber (i.e., trunk fiber 210).

Electrical and optical interface specifications for PON extension system 200 are standardized by the Society of Cable Telecommunications Engineers (SCTE). The centralized structure of PON extension system 200 generally simplifies maintenance, reduces operational costs, and improves reliability for cable operators.

PON extension system 200, however, has several limitations with respect to scalability for the increasing per-subscriber data rates, and with respect to newer technologies used by cable operators, as well as their related services and applications. Conventional PON extender architectures not configured, for example, sufficiently to employ upcoming technologies such as next-generation PON (NG-PON, NG-PON2) based on time and wavelength division multiplexing (TWDM), which deploys at 40-Gb/s or more, or 100G-EPON, which are multi-wavelength PON systems. The conventional PON extender is unable to meet wavelength resource requirements of these newer technologies. For a PON extender to increase data transmission from 10 Gb/s to 40 Gb/s, for example, the PON extender would have to manage at least four wavelengths each in the upstream and downstream directions for every ONU, or else upgrade the 10G MSA transceivers to 25-40 Gb/s per channel with direct detection. Conventional PON extenders are not configured to manage eight or more discrete modules in parallel for each ONU, and merely upgrading a 10G MSA transceiver may significantly impair the chromatic dispersion of the signals transmitted therethrough.

BRIEF SUMMARY

In an embodiment, a coherent passive optical network extender apparatus includes an extender transceiver for communication with an associated optical headend. The extender transceiver includes at least one receiving portion, at least one transmitting portion, and an extension processor. The apparatus further includes a signal adaptation unit configured to convert a downstream electrical transmission lane into a plurality of individual wavelengths. Each of the converted individual wavelengths are for transmission to one of an optical node and an end user. The apparatus further includes a plurality of transceivers, disposed within the signal adaptation unit, and configured to process and transmit the converted individual wavelengths as a bundle for retransmission to the respective end users.

An optical network communication system utilizes a passive optical network (PON). The system includes an optical headend. The optical headend includes an optical line terminal and a hub transceiver. The optical line terminal is configured to convert standard signals to a frequency and framing of the PON for transmission from the hub transceiver, and to coordinate multiplexing throughout the system. The system further includes a trunk fiber configured to carry transmitted signals from the hub transceiver, and a coherent PON extender configured to recover coherent optical signals transmitted over the trunk fiber. The coherent PON extender is further configured to retransmit the recovered coherent optical signals. The system still further includes an extension fiber configured to carry the retransmitted coherent optical signals to one of an optical network unit and/or a customer premises.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
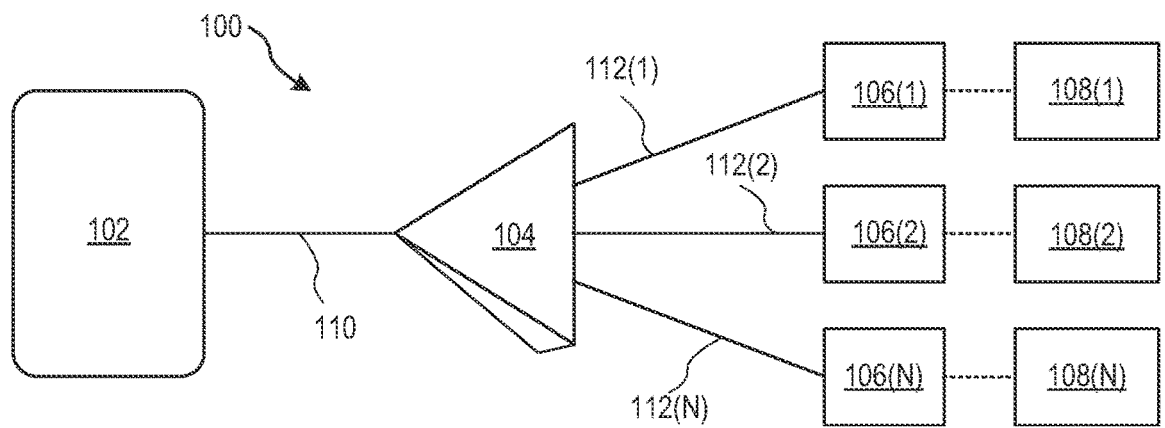
FIG. 1 is a schematic illustration of a conventional PON system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments herein, a coherent PON extension system is capable of deploying optical transmissions, including NG-PON and 100G-EPON, for fiber trunk links spanning over 100 miles. The coherent PON extension embodiments described herein are particularly advantageous in the deployment of coherent technologies in FTTP access networks.

Coherent technologies have been recently implemented for optical metro and access networks, in both brown- and green-field deployments. Digital coherent systems utilize digital signal processing (DSP) techniques, and achieve high spectral efficiency (SE), higher data rate per channel, and superior receiver sensitivity that allows for extended power budget. Coherent detection is capable of high frequency selectivity through local oscillator (LO) tuning capability, which enables closely spaced, dense/ultra-dense WDM (DWDM) without requiring additional narrow band optical filters. Coherent detection systems recover a multi-dimensional signal, which, among other things, compensates for linear transmission impairments such as chromatic dispersion (CD) and polarization-mode dispersion (PMD). Coherent detection more efficiently utilize the spectral resources, and may take advantage of future network upgrades through the use of multi-level advanced modulation formats. This utilization of coherent optics has now migrated from long haul and metro networks, to data-center interconnect (DCI) and near-future access networks.

Accordingly, the coherent PON extension systems and methods described herein advantageously implement coherent technologies to achieve high speed/data rate transmission over existing fiber trunk links for distances greater than 100 km, or 100 miles in some instances. The present embodiments feature a novel and advantageous PON extender architecture that utilizes coherent optics within the trunk link to significantly increase bandwidth capacity, while also simplifying the operational complexity of system hardware by minimizing the number of parallel electronic/optical WDM modules.

Utilizing coherent detection technologies, the receiver sensitivity is significantly greater as compared with conventional direct detection technologies. The coherent PON extension system herein thus provides higher spectral efficiency the in a conventional PON extension system. Unlike the conventional PON extension system, the present coherent PON extension system is compatible with DWDM operation. According to the systems and methods described herein, cable operators utilizing the coherent PON extension system realize more efficient fiber utilization, while also achieving centralized OLT configuration that serves more customer premises utilizing the existing infrastructure the operator. In some embodiments, the coherent PON extension systems and methods described herein one or both of wavelength-split and power-split architectures for a multi-wavelength PON transmission scheme.

Figure 3:
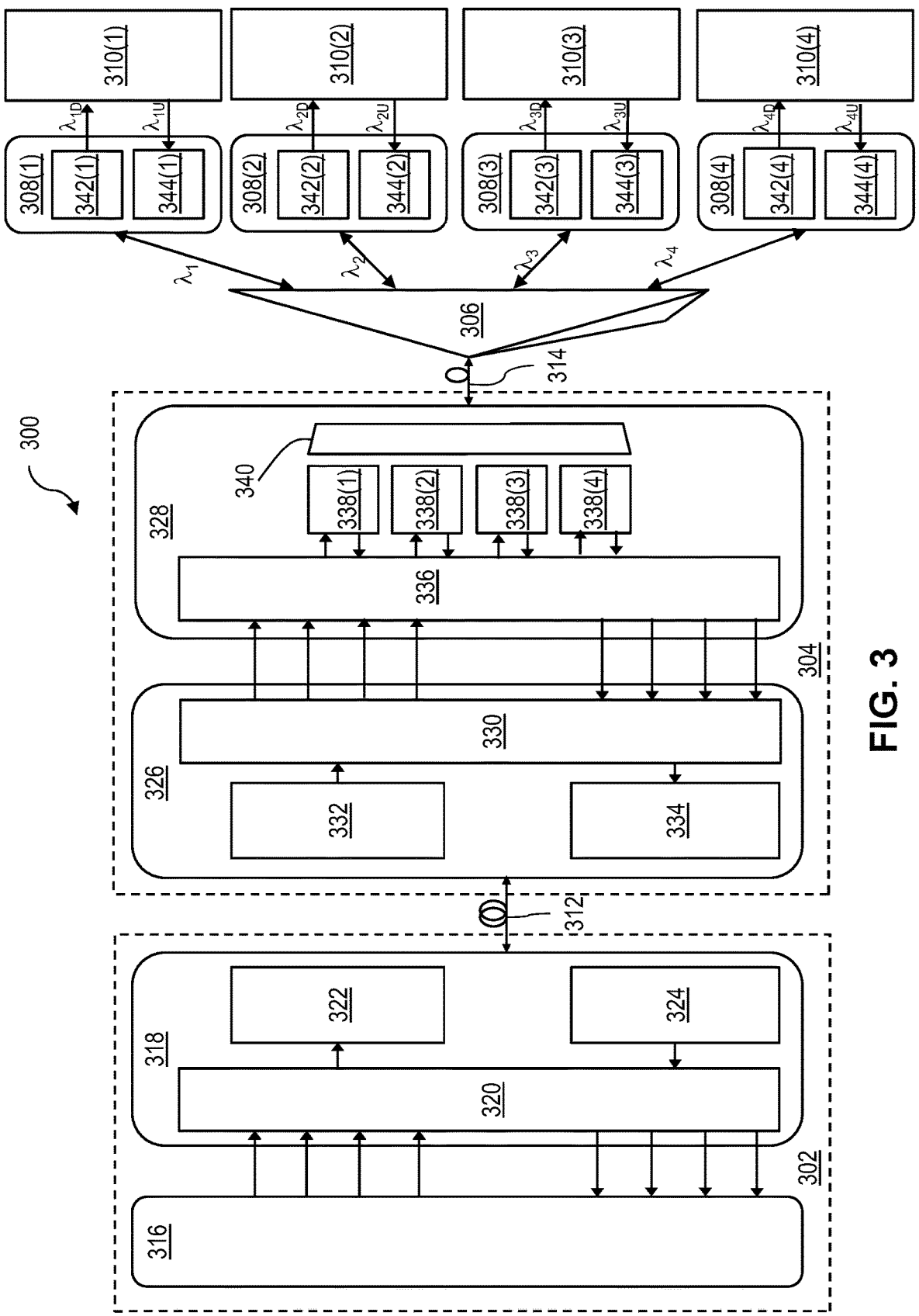
FIG. 3 is a schematic illustration of an exemplary fiber communication system utilizing coherent PON transmission.

FIG. 3 is a schematic illustration of an exemplary fiber communication system 300 utilizing coherent PON transmission. System 300 includes an OHE 302, a coherent PON extender 304, at least one node/splitter 306, a plurality of downstream termination units 308 and a plurality of respective end users 310. Units 308 may be, for example, an ONU or a cellular base station (including small cell base stations). End users 310 may be, for example, a customer device or customer premises (e.g., a home, apartment building, or residential radio frequency over glass (RFoG) subscriber) or a business user (including point to multipoint fiber networks with business EPON subscribers). OHE 302 is, for example, a central office or a communications hub. In an exemplary embodiment, system 300 implements a PON and a DWDM PON architecture.

OHE 302 communicates with coherent PON extender 304 by way of trunk fiber 312, and PON extender 304 communicates with node/splitter 306 over extension fiber 314. In an exemplary embodiment, one or more of trunk fiber 312 and extension fiber 314 communicate both the upstream and downstream transmission over the same fiber. In some embodiments, one or more of trunk fiber 312 in extension fiber 314 communicate upstream transmission over one fiber, and downstream transmission over a different fiber.

OHE 302 includes an OLT 316 and a hub transceiver 318. Hub transceiver 318 includes a transceiver processor 320, a hub transmitting portion 322, and a hub receiving portion 324. In an exemplary embodiment, transceiver processor 320 includes one or more processing components, including without limitation, an analog to digital converter (ADC), a digital signal processor (DSP), an application specific integrated circuit (ASIC), a forward error correction (FEC) unit, a digital to analog converter (DAC), and one or more multiplexers/demultiplexers.

In some embodiments, each of hub transmitting portion 322 and hub receiving portion 324 have their own dedicated transceiver processor and processing components. In the exemplary embodiment, hub transmitting portion 322 includes an optical circulators and modulator, and hub receiving portion 324 includes an integrated coherent transmitter. Exemplary architectures of hub transceiver and processing components are described in greater detail in co-pending U.S. patent application Ser. No. 15/283,632, filed Oct. 3, 2016, and co-pending U.S. patent application Ser. No. 15/590,464, filed May 9, 2017, the disclosures of both which are incorporated by reference herein. Additionally, system 300 is illustrated in FIG. 3 with only one hub transceiver 318 for ease of explanation. A person of ordinary skill in the art though, will understand that OHE 302 may utilize a plurality of separate transceivers, which may be multiplexed according to the co-pending disclosures.

Coherent PON extender 304 includes an extender transceiver 326 and a signal adaptation unit 328. The architecture of extender transceiver 326 may be similar to that of hub transceiver 318, and includes an extender processor 330, an extender receiving portion 332, and an extender transmitting portion 334, as well as one or more of the additional components described above. Signal adaptation unit 328 includes a signal adapter processor 336, a plurality of adapter transceivers 338, and at least one multiplexer 340.

In operation of system 300, signals $\lambda_{1D}$-$\lambda_{4D}$ in the downstream electrical lane and signals $\lambda_{1U}$-$\lambda_{4U}$ in the upstream electrical lane are communicated between OLT 316 and transceiver processor 320 of hub transceiver 318. The downstream electrical lane is multiplexed at OHE 302 and transmitted over trunk fiber 312 to coherent PON extender 304. Similarly, the upstream electrical lane is received by OHE 302 and demultiplexed into the respective upstream electrical signals. The upstream and downstream electrical lanes are communicated between extender processor 330 and signal adapter processor 336. Signal adapter processor 336 pairs the individual upstream and downstream signals with their respective counterparts, for further transmission to/reception of the optical signal pairs with respective ONU transmitters 342 and ONU receivers 344.

Figure 2:
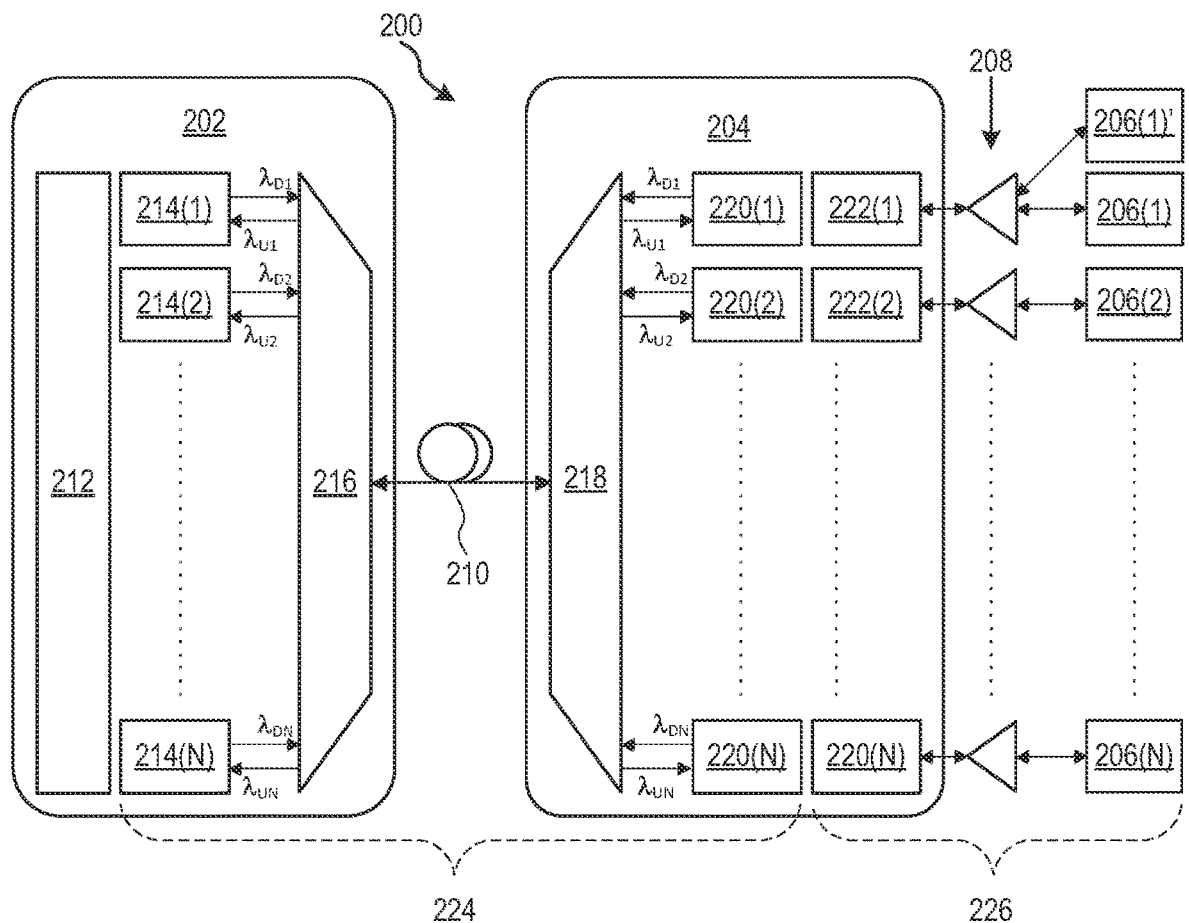
FIG. 2 is a schematic illustration of a conventional PON extension system.

In some embodiments, system 300 represents a 36 decibel (36-dB) optical link budget, and each of the downstream and upstream electrical lanes are 10G electrical lanes. That is, trunk fiber 312 carries a 40G coherent optical transmission in each of the upstream and downstream directions, e.g., $\lambda_{40G\text{-}coherent\text{-}down}$ and $\lambda_{40G\text{-}coherent\text{-}up}$. The 36-dB optical link budget may be applied, for example, to a 4×10G NG-PON2 network. System 300 thus represents a significant improvement over conventional system 200 (FIG. 2, above), which cannot, in a stable manner, configure each ONU 206 to transmit four separate wavelengths in parallel with a per wavelength channel line rate of 10 Gb/s.

In other embodiments, system 300 represents a 30-dB optical link budget, and each of the downstream and upstream electrical lanes are 25G electrical lanes. That is, trunk fiber 312 carries a 100G coherent optical transmission in each of the upstream and downstream directions, e.g., $\lambda_{100G\text{-}coherent\text{-}down}$ and $\lambda_{100G\text{-}coherent\text{-}up}$. The 30-dB optical link budget may be applied, for example, to a 4×25G EPON network (100G-EPON). System 300 thus represents a further improvement over conventional system 200 (FIG. 2, above), which would suffer from chromatic dispersion impairment if the conventional extender receivers 220 were upgraded to carry a channel line rate of 25 Gb/s. The matching processing components between OHE 302 and coherent PON extender 304 (e.g., such as the ASIC) removes the chromatic dispersion deficiencies experienced by the conventional PON extenders.

In an exemplary embodiment, system 300 further utilizes TWDM. In some embodiments, each coherent trunk link of system 300 is based on dual-polarization quadrature phase-shift keying (DP-QPSK) or 16-ary quadrature amplitude modulation (16-QAM) formats for 40G and 100G coherent links, with one wavelength of a wavelength pair for downstream transmission, and the other wavelength of the pair for upstream transmission. Additionally, utilization of an ASIC in hub transceiver 318 and extender transceiver 326 removes DSP chromatic dispersion, and only requires use of hard-decision FEC instead of soft-decision FEC from the FEC unit. According to the advantageous embodiments illustrated in FIG. 3, a cable operator will realize a substantial improvement on optical link power budget, and for even greater transmission distances, for example, over 100 km. The improved architecture of system 300 further eliminates the need for costly gearboxes (e.g., Serializer/De-serializer or SERDES) for electrical signal conversion. Instead, system 300 more seamlessly interfaces with the total data rate of an NG-PON network, for example, thereby substantially mitigating the deficiencies of conventional PON extenders, such as system transmission impairment and receiver sensitivity.

Figure 4:
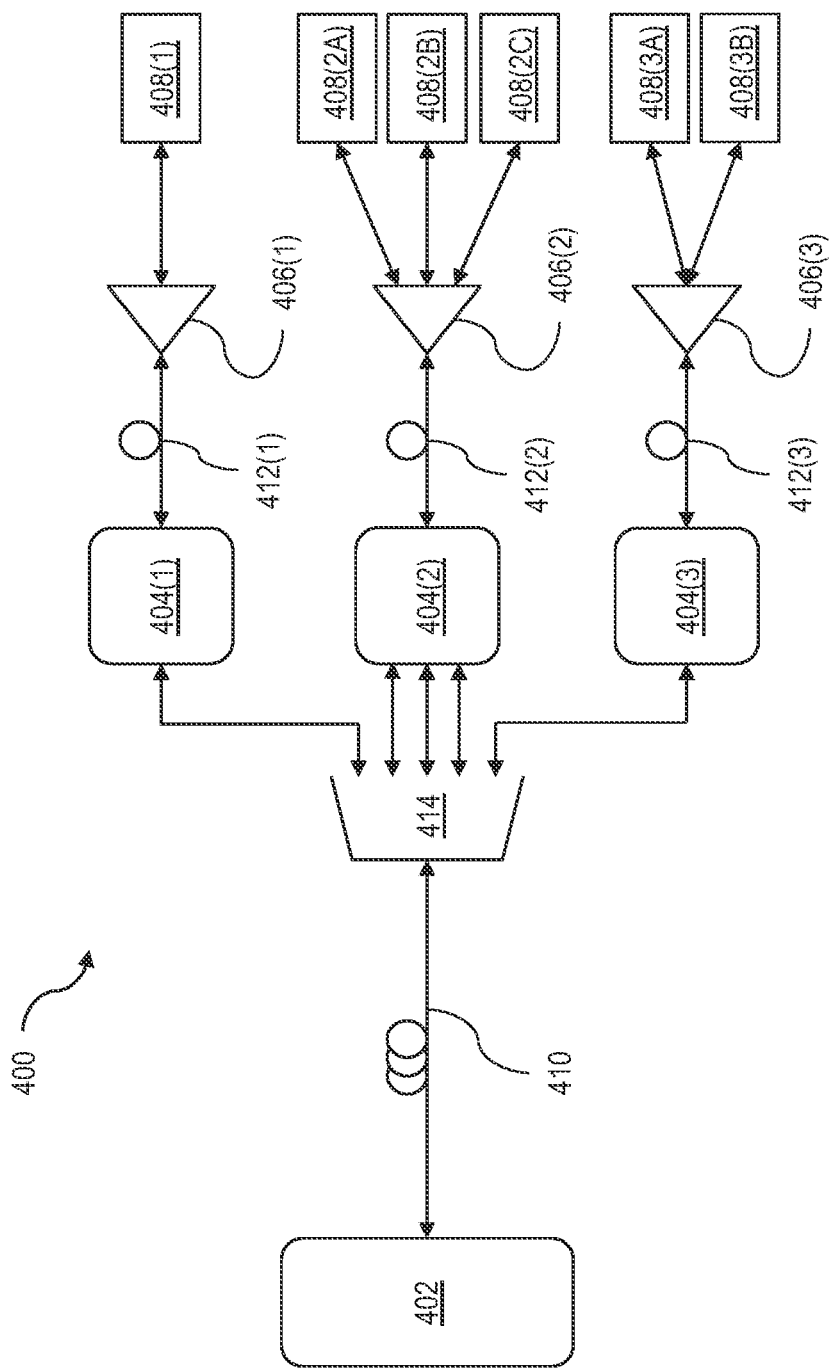
FIG. 4 is a schematic illustration of an exemplary fiber communication system utilizing the coherent PON extender depicted in FIG. 3, implementing a power-split connection.

FIG. 4 is a schematic illustration of an exemplary fiber communication system 400 utilizing coherent PON extender 304 depicted in FIG. 3, as well as additional complementary components of system 300. System 400 is implemented, for example, for an NG-PON network or a 100G-EPON network, and utilizes a power-split connection for servicing various remote nodes of the network. In the exemplary embodiment, the trunk link of system 400 is a 100G/200G DWDM coherent 100 km link.

System 400 includes an OHE 402, a plurality of coherent PON extenders 404, a plurality of remote nodes 406, a plurality of end users 408, a trunk fiber 410, and a plurality of extension fibers 412. In this example, end users 408 may each include one or more ONUs or base stations, for servicing one or more customer devices/premises business users. OHE 402 is otherwise is similar to OHE 302 (FIG. 3), coherent PON extenders 404 are similar to coherent PON extender 304, and remote nodes 406 are similar to node/splitter 306. System 400 further includes a power splitter/combiner 414 disposed between OHE 402 and the plurality of coherent PON extenders 404. OHE 402 communicates with coherent PON extenders 404, through power splitter/combiner 414, by way of trunk fiber 410. Coherent PON extenders 404 communicate with remote nodes 406 over respective extension fibers 412. Trunk fiber 410 may span, for example, a distance of 100 km, and extension fibers 412 may span a distance of 20 km. In some embodiments, each coherent PON extender 404 may represent 1, 2, 3, or more PON OLTs. For example, as depicted in FIG. 4, extender 404(1) represents a single OLT, extender 404(2) represents three OLTs, and extender 404(3) represents to OLTs.

In operation, system 400 utilizes power splitter/combiner 414, located along trunk fiber 410 between OHE 402 and coherent PON extenders 404 in a point-to-multipoint configuration. The narrow filtering functional capability of coherent detection technology allows the system 400 to advantageously utilize the tunable ability of an LO (not shown) and a transmitted wavelength to power-split the coherent optical link among multiple coherent PON extenders. System 400 thus achieves optical demultiplexing within a coherent optical receiver (e.g., receiver/receiving portions 324, 332, FIG. 3) having a wavelength tunable capability of LO sources for each coherent PON extender 304. In some embodiments, multiple LO sources are utilized for each coherent PON extender 404 representing multiple PON OLTs (e.g., extenders 404(2), 404(3)). According to the advantageous architecture depicted in FIG. 4, system 400 thus is capable of performing as two cascade PON systems, with the coherent optical link (headend-to-extender) as the first stage, and a standard PON (node-to-end user) as the second stage.

Figure 5:
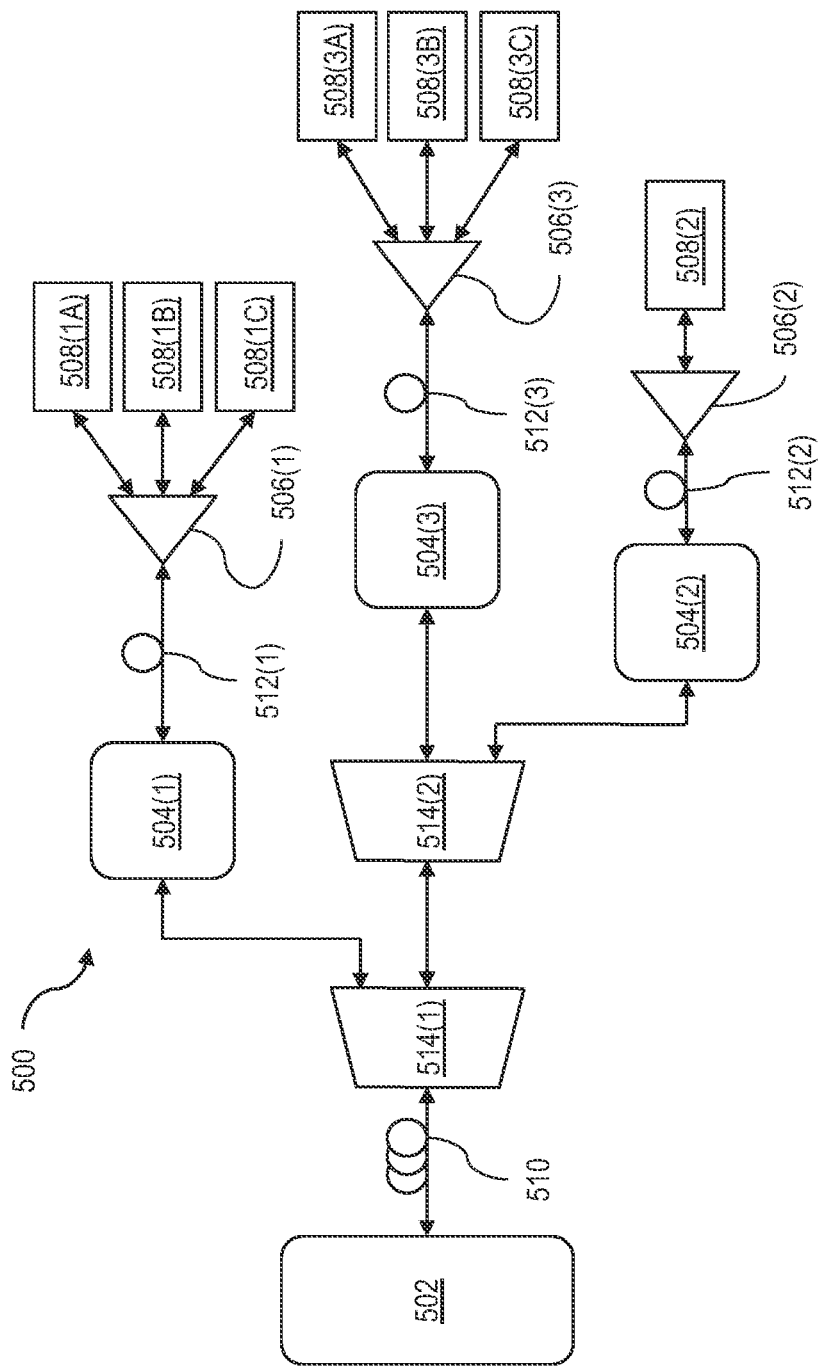
FIG. 5 is a schematic illustration of an exemplary fiber communication system utilizing the coherent PON extender depicted in FIG. 3, implementing a wavelength-split connection.

FIG. 5 is a schematic illustration of an exemplary fiber communication system utilizing the coherent PON extender depicted in FIG. 3, implementing a wavelength-split connection. Similar 500 is similar to system 400, in that it may be implemented with an NG-PON network or a 100G-EPON network, and may further include a 100G/200G DWDM coherent 100 km link. Additionally, a person of ordinary skill in the art will comprehend how the wavelength-split principles of system 500, described below, may be implemented in combination with the power-split principles system 400, described above.

System 500 includes an OHE 502, a plurality of coherent PON extenders 504, a plurality of remote nodes 506, a plurality of end users 508, a trunk fiber 510, and a plurality of extension fibers 512, similar to system 400, above. System 500 further includes a plurality of WDM filters 514 that serve as add/drop points 514 along trunk fiber 510. In an exemplary embodiment, each of coherent PON extenders 504 may service the same, or different, type of PON network. For example, coherent PON extender 504(1) may represent a 10×10G PON OLT for a 10G GPON or EPON network; coherent PON extender 504(2) may represent a 100G PON OLT for an NG-PON2 or 100G-EPON network; coherent PON extender 504(3) may represent a 3×100G PON OLTs for an NG-PON2 or 100G-EPON network.

In operation, system 500 implements DWDM coherent optics and utilizes a cascade of WDM filters 514 (as opposed to power splitter/combiner 414, FIG. 4) along the headend-to-extender trunk link to create multiple add/drop locations for the plurality of coherent PON extenders 504. In an exemplary embodiment, downstream optical signals are multiplexed at OHE 502 into respective 100G or 200G coherent wavelength channels on the same fiber (e.g., trunk fiber 510) for transmission to the plurality of coherent PON extenders 504. Single-channel or multiple-channels coherent PON extenders may then be connected to the main trunk link through the add/drop WDM filters 514. Each connected coherent PON extender 504 may then recover the received optical signals and retransmit recovered signals to the respective remote node over respective extension fibers 512, with the signals are then transmitted to the plurality of end users 508 with standard PON formats.

In the exemplary embodiment, each coherent PON extender 504 may be implemented for a single PON, dual PONs, or multiple PONs. The architecture of system 500 is further advantageously compatible with conventional PON extender system 200 (for 10G PON), but offers greater flexibility than the conventional PON extension systems to reach more clusters of residential and business areas. System 500 achieves still further flexibility over the conventional PON extension systems by being able expand the amount of data transmitted by adjusting the baud rate, modulation format, and/or other parameters, before additional wavelengths must be added to carry the additional data. Wavelengths are considered a precious resource within the modern cable fiber infrastructure.

According to the advantageous systems and methods described above, a coherent PON extension architecture utilizes coherent optics in either or both ends of the trunk link to deliver coherent signals over longer trunk fiber distances. The systems and methods described herein utilizing existing fiber infrastructures to increase the capacity of the infrastructures to utilize expanding and next generation PON technologies, but without requiring the addition of unnecessary wavelengths. According to the embodiments described herein, future high bandwidth demand can be met utilizing existing network infrastructures, while also simplifying the operational complexity of the PON hardware by minimizing the number of parallel electronic/optical WDM modules. The present systems and methods thus significantly extend the life of existing fiber infrastructures, while more efficiently using existing optical wavelengths. Through the techniques described herein, a fiber communication network may realize significantly increased scalability, to flexibly grow according to increasing demand from users of both cable operator and cellular services.

Exemplary embodiments of fiber communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A passive optical network (PON) extender apparatus, comprising:
    an extender transceiver for communication with an associated optical communication hub, the extender transceiver including (i) at least one coherent receiving portion configured to receive a single coherent optical wavelength from the optical communication hub, (ii) at least one coherent transmitting portion, and (iii) an extender processor;
    a signal adaptation unit separate from the extender transceiver and configured to (i) receive an input plurality of downstream electrical transmission signals from the coherent receiving portion, and (ii) output a plurality of individual downstream optical channels;
    a plurality of adaptation transceivers disposed within the signal adaptation unit, each adaptation transceiver of the plurality of adaptation transceivers configured to convert one of the input plurality of downstream electrical transmission signals into one or more of the plurality of individual downstream optical channels; and
    a multiplexer configured to bundle the plurality of individual downstream optical channels for transmission to respective ones of a plurality of one or more of a remote optical node, a downstream termination unit, and an end-user,
    wherein each downstream optical channel of the plurality of individual downstream optical channels is based on at least one respective input electrical transmission signal of the input plurality of downstream electrical transmission signals.

2. The apparatus of claim 1, wherein the PON is one or more of a next generation (NG) PON network and a 100G-EPON network.

3. The system of claim 1, wherein the single coherent optical wavelength from the optical communication hub implements one or more of dense/ultra-dense wavelength division multiplexing (DWDM) and time and wavelength division multiplexing (TWDM).

4. The apparatus of claim 1, wherein the extender processor includes one or more of an analog to digital converter (ADC), a digital signal processor (DSP), an application specific integrated circuit (ASIC), a forward error correction (FEC) unit, a digital to analog converter (DAC), and one or more multiplexers/demultiplexers.

5. The apparatus of claim 1, wherein the signal adaptation unit further comprises a signal adapter processor configured to pair each downstream optical channel with a respective upstream counterpart from an upstream electrical lane.

6. The apparatus of claim 5, wherein the signal adaptation unit is further configured to aggregate the paired wavelength counterparts.

7. An optical network communication system utilizing a passive optical network (PON), comprising:
- a coherent optical communication hub including an optical line terminal (OLT) and a hub transceiver, the OLT being configured to (i) convert standard signals to a frequency and framing of the PON for transmission from the hub transceiver, and (ii) to coordinate multiplexing throughout the system;
- a trunk fiber configured to carry transmitted downstream coherent optical signals from the hub transceiver;
- a coherent PON extender configured to (i) recover at least one single downstream coherent optical signal from the trunk fiber, (ii) convert the recovered single downstream coherent optical signal into a plurality of downstream electrical signals, (iii) pair each downstream electrical signal of the converted plurality of downstream electrical signals with a respective corresponding downstream optical channel different from the at least one single downstream coherent optical signal, and (iv) assign the respective corresponding downstream optical channels for individual downstream distribution; and
- a plurality of extension fibers configured to carry the respective corresponding downstream optical channels to individual ones of an optical network unit (ONU), a remote optical node, a downstream termination unit, and/or a customer premises.

8. The system of claim 7, wherein the OLT implements one or more of dense/ultra-dense wavelength division multiplexing (DWDM) and time and wavelength division multiplexing (TWDM).

9. The system of claim 7, wherein the hub transceiver includes one or more of a hub coherent optical receiving portion, a hub coherent optical transmitting portion, and a transceiver processor.

10. The system of claim 9, wherein the transceiver processor includes one or more of an analog to digital converter (ADC), a digital signal processor (DSP), an application specific integrated circuit (ASIC), a forward error correction (FEC) unit, a digital to analog converter (DAC), and one or more multiplexers/demultiplexers.

11. The system of claim 10, wherein the coherent PON extender includes an extender coherent optical transceiver and a signal adaptation unit.

12. The system of claim 11, wherein the extender transceiver includes one or more of an extender coherent optical transmitting portion, an extender coherent optical receiving portion, and an extender processor.

13. The system of claim 11, wherein the signal adaptation unit includes one or more of a signal adapter, a plurality of adapter transceivers, and a multiplexer.

14. The system of claim 7, wherein the remote optical node is configured to receive and transmit one or more (i) optical wavelengths, and/or (ii) optical channels.

15. The system of claim 7, wherein the coherent PON extender comprises a plurality of individual PON extenders.

16. The system of claim 15, further comprising at least one power splitter/combiner disposed along the trunk line between the optical communication hub and the plurality of individual coherent PON extenders.

17. The system of claim 16,
- wherein the system performs as two stages of a cascade PON system,
- wherein the first stage of the cascade includes the head-end-to-extender span and serves as a coherent optical link, and
- wherein the second stage of the cascade includes the node-to-end user span, and serves as a standard PON optical link.

18. The system of claim 15, further comprising a plurality of WDM filters disposed along the trunk line between the optical communication hub and the plurality of individual coherent PON extenders.

19. The system of claim 18, wherein the plurality of WDM filters locate add/drop points along the trunk fiber for individual ones of the plurality of coherent PON extenders.

* * * * *